(12) United States Patent
Kulshreshtha et al.

(10) Patent No.: US 12,277,211 B2
(45) Date of Patent: *Apr. 15, 2025

(54) SECURITY POLICIES FOR SOFTWARE CALL STACKS

(71) Applicant: Cisco Technology, Inc., San Jose, CA (US)

(72) Inventors: Ashutosh Kulshreshtha, Cupertino, CA (US); Andy Sloane, Pleasanton, CA (US); Hiral Shashikant Patel, San Jose, CA (US); Uday Krishnaswamy Chettiar, Redwood City, CA (US); Oliver Kempe, Santa Clara, CA (US); Bharathwaj Sankara Viswanathan, Mountain View, CA (US); Navindra Yadav, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,114

(22) Filed: Apr. 25, 2024

(65) Prior Publication Data

US 2024/0273181 A1 Aug. 15, 2024

Related U.S. Application Data

(63) Continuation of application No. 17/023,035, filed on Sep. 16, 2020, now Pat. No. 12,039,031.

(51) Int. Cl.
*G06F 21/52* (2013.01)
*G06F 18/214* (2023.01)
(Continued)

(52) U.S. Cl.
CPC ............ *G06F 21/52* (2013.01); *G06F 18/214* (2023.01); *G06F 21/51* (2013.01); *G06F 21/577* (2013.01); *G06N 20/00* (2019.01)

(58) Field of Classification Search
CPC ........ G06F 21/52; G06F 18/214; G06F 21/51; G06F 21/577; G06N 20/00
See application file for complete search history.

(56) References Cited

U.S. PATENT DOCUMENTS

| | | |
|---|---|---|
| 5,625,788 A | 4/1997 | Boggs et al. |
| 7,350,204 B2 | 3/2008 | Lambert et al. |

(Continued)

FOREIGN PATENT DOCUMENTS

CN 109766698 A 5/2019

OTHER PUBLICATIONS

International Search Report and Written Opinion for International Application No. PCT/US2021/049678, mailed Nov. 11, 2021, 12 Pages.

*Primary Examiner* — Shin-Hon (Eric) Chen
*Assistant Examiner* — Thomas A Carnes
(74) *Attorney, Agent, or Firm* — Polsinelli P.C.

(57) ABSTRACT

The present disclosure provides systems, methods, and computer-readable media for implementing security polices at software call stack level. In one example, a method includes generating a call stack classification scheme for an application, detecting a call stack during deployment of the application; using the call stack classification scheme during runtime of the application, classifying the detected call stack as one of an authorized call stack or an unauthorized call stack to yield a classification; and applying a security policy based on the classification.

18 Claims, 10 Drawing Sheets

(51) Int. Cl.
  *G06F 21/51* (2013.01)
  *G06F 21/57* (2013.01)
  *G06N 20/00* (2019.01)

(56) References Cited

U.S. PATENT DOCUMENTS

| | | | |
|---|---|---|---|
| 8,863,232 | B1 | 10/2014 | Tidd |
| 9,160,749 | B2 | 10/2015 | Subramanian et al. |
| 9,509,697 | B1* | 11/2016 | Salehpour .............. G06F 21/52 |
| 9,602,437 | B1 | 3/2017 | Bernath |
| 9,942,268 | B1 | 4/2018 | Danileiko |
| 10,509,685 | B2 | 12/2019 | Gong et al. |
| 10,558,809 | B1* | 2/2020 | Joyce .................... G06N 5/046 |
| 10,606,683 | B1 | 3/2020 | Culibrk et al. |
| 11,080,125 | B1* | 8/2021 | Raj .................... G06F 11/0709 |
| 2006/0005019 | A1 | 1/2006 | Chao |
| 2006/0070046 | A1 | 3/2006 | Balakrishnan et al. |
| 2009/0319629 | A1* | 12/2009 | de Guerre ............ G06Q 10/107  726/1 |
| 2014/0310714 | A1 | 10/2014 | Chan et al. |
| 2016/0088011 | A1 | 3/2016 | Johri et al. |
| 2016/0147992 | A1 | 5/2016 | Zhao et al. |
| 2016/0314296 | A1* | 10/2016 | Attfield ............... G06F 9/30094 |
| 2017/0124324 | A1 | 5/2017 | Peleg et al. |
| 2017/0322877 | A1 | 11/2017 | Chan |
| 2018/0089004 | A1 | 3/2018 | Nitsan et al. |
| 2018/0107821 | A1* | 4/2018 | Eshkenazi ............... G06F 21/52 |
| 2018/0203703 | A1 | 7/2018 | Moudgill et al. |
| 2018/0232213 | A1* | 8/2018 | Greene ..................... G06F 8/38 |
| 2018/0314843 | A1 | 11/2018 | Anderson et al. |
| 2019/0108342 | A1 | 4/2019 | Conikee et al. |
| 2019/0286821 | A1* | 9/2019 | Strogov ................ G06F 21/568 |
| 2019/0318089 | A1 | 10/2019 | Wang |
| 2019/0318090 | A1 | 10/2019 | Sandoval et al. |
| 2019/0340357 | A1 | 11/2019 | David et al. |
| 2019/0340392 | A1* | 11/2019 | Khorrami ............... G06F 21/71 |
| 2020/0026865 | A1 | 1/2020 | Hulick, Jr. |
| 2020/0204589 | A1 | 6/2020 | Strogov et al. |
| 2020/0210580 | A1 | 7/2020 | Strogov et al. |
| 2020/0394329 | A1 | 12/2020 | Jayaprakash et al. |
| 2021/0109843 | A1 | 4/2021 | Datta et al. |
| 2022/0083644 | A1 | 3/2022 | Kulshreshtha et al. |

\* cited by examiner

SECURITY POLICIES FOR SOFTWARE CALL STACKS

CROSS-REFERENCE TO RELATED APPLICATIONS

The present application is a continuation of U.S. patent application Ser. No. 17/023,035 filed Sep. 16, 2020, entitled, "SECURITY POLICIES FOR SOFTWARE CALL STACKS", which is hereby incorporated by reference in its entirety.

TECHNICAL FIELD

The subject matter of this disclosure relates in general to the field of application security, and more specifically to applying security measures to software call stacks inside applications during their runtime to enhance their security.

BACKGROUND

Zero-trust security policies for applications require strict identity verification for individuals and devices attempting to access an application. Currently, zero-trust security policies for applications apply whitelisting concept on an application level. Such zero-trust security policies secure an application by allowing pre-determined network paths that are included in the whitelist to access the application. Zero-trust policies can significantly reduce the number of potential sources of attack or security threats by preventing potentially malicious sources from accessing the application.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
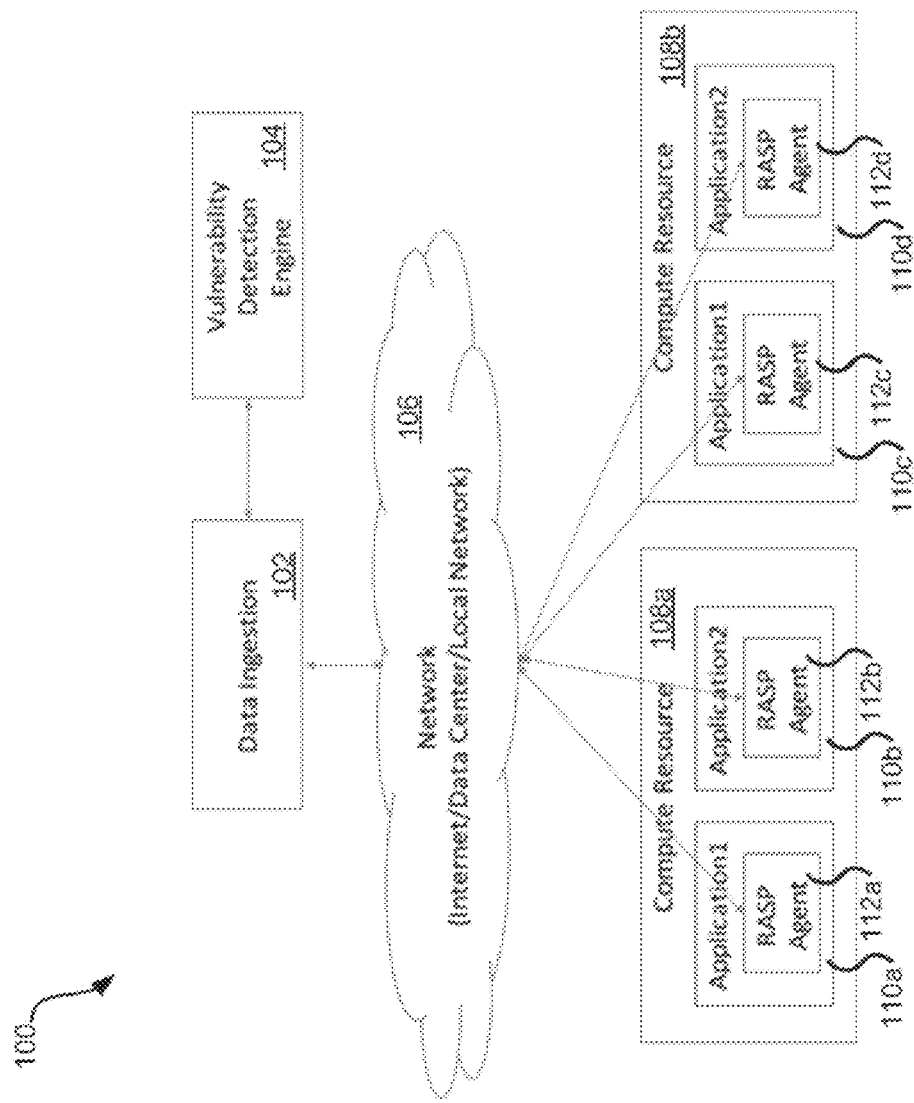
FIGS. 1A-B illustrate aspects of a network environment, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the subject technology relate to applying security policies at the software call stack level in applications based on software call stacks classification. An authorized list of call stacks associated with an application are determined using a manual process and/or an automated process (e.g., using a machine learning (ML) technique).

During various stages of deployment of an application, the lists are used to determine whether a call stack can be accessed by the application or not.

In one aspect, a method includes generating a call stack classification scheme for an application; detecting a call stack during deployment of the application; using the call stack classification scheme during runtime of the application, classifying the detected call stack as one of an authorized call stack or an unauthorized call stack to yield a classification; and applying a security policy based on the classification.

In another aspect, the call stack classification scheme includes a whitelist of authorized call stacks accessible by the application.

In another aspect, the call stack classification scheme includes a classifier trained using a machine learning technique for identifying detected call stacks as one of authorized or unauthorized call stacks.

In another aspect, training the classifier includes using a list of previously known authorized call stacks and a list of previously known unauthorized call stacks to train the classifier.

In another aspect, the classifier is trained to output a score for the detected call stack during the runtime of the application.

In another aspect, classifying the detected call stack further includes comparing the score to a threshold; and classifying the call stack as the authorized call stack if the score is greater than the threshold.

In another aspect, the classifier is trained to output the classification of the call stack detected during the runtime as one of the authorized call stack or the unauthorized call stack.

In one aspect, a system includes one or more memories having computer-readable instruction stored therein; and one or more processors configured to execute the computer-readable instructions to generate a call stack classification scheme; detect a call stack during deployment of an application; use the call stack classification scheme during runtime of the application, classify the detected call stack as one of an authorized call stack or an unauthorized call stack to yield a classification; and apply a security policy based on the classification.

In one aspect, one or more non-transitory computer-readable storage media include computer-readable instructions which, when executed by one or more processors of a security system, cause the security system to generate a call stack classification scheme; detect a call stack during deployment of an application; use the call stack classification scheme during runtime of the application, classify the detected call stack as one of an authorized call stack or an unauthorized call stack to yield a classification; and apply a security policy based on the classification.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

As noted above, current zero-trust application security policies may be implemented based on the whitelisting concept at an application level. Such policies can reduce the number of potential sources of attacks or security threats by preventing attempts by potentially malicious sources from accessing applications. Furthermore, such applications can include many (e.g., hundreds, thousands, etc.) software call stacks with access to the applications during their runtime at various stages of testing, pre-production and production. These software call stacks are utilized in the functioning of any application. For example, software call stacks can store information about the active subroutines of an application, and keep track of the point to which each active subroutine returns control when it finishes executing. Thus, call stacks introduce another possibility of unauthorized access to applications that can undermine the overall application security. Currently, there is a lack of zero-trust security policies schemes for implementation at the software call stack level.

The disclosed technology improves application security at the software call stacks level. One example improvement provided here is directed to implementing security policies at the software call stacks level by identifying a list of authorized call stacks (a whitelist). Implementing security policies on individual software call stack based on a whitelist can significantly reduce the number of potential sources of attack or security threats to applications (e.g., enterprise applications) at the software call stack level and thus improve the overall network security.

A whitelist of software call stacks for an application can be determined manually and/or using machine learning models. As will be described below, in one example, a call stacks classification service can be trained using machine learning techniques to implement a scoring system for determining whether to classify a software call stack detected during execution/deployment of an application as an authorized call stack or not for purposes of applying security policies. Feedbacks can be provided to the classifier during the training of the classifier to improve the classification process. For example, the list of borderline software call stacks can be reviewed manually and labeled as either authorized or unauthorized to further train the machine learning model. The process of training and utilizing a classifier for implementing security policies at the software call stack level will be more fully described below.

The disclosure begins with a description of example systems in which the present disclosure related to zero-trust application security at the software call stacks level may be deployed.

FIG. 1A illustrates a diagram of an example network environment 100 according to one aspect of this disclosure. Network environment 100 (system 100) can include network 106 can represent any type of communication, data, control, or transport network. For example, the network 106 can include any combination of wireless, over-the-air network (e.g., Internet), a local area network (LAN), wide area network (WAN), software-defined WAN (SDWAN), data center network, physical underlay, overlay, or other. Network 106 can be used to connect various network elements such as routers, switches, fabric nodes, edge devices, aggregation switches, gateways, ingress and/or egress switches, provider edge devices, and/or any other type of routing or switching device, compute devices or compute resources such as servers, firewalls, processors, databases, virtual machines, etc.

Compute resources 108a and 108b represent examples of the network devices which may be connected to network 106 for communications with one another and/or with other devices. For example, compute resources 108a and 108b can include various host devices, servers, processors, virtual machines, or others capable of hosting applications, executing processes, performing network management functions, etc. In some examples, applications 110a and 110b can be execute on compute resource 108a, and applications 110c and 110d can execute on compute resource 108b. Applications 110a can include any type of software applications, processes, or workflow defined using instructions or code.

A data ingestion block 102 representatively shows a mechanism for providing input data to any one or more of applications 110a, 110b, 110c, and 110d. Network 106 can be used for directing the input data to corresponding applications 110a, 110b, 110c, and 110d for execution. One or more applications 110a, 110b, 110c, and 110d may generate and interpret program statements obtained from the data ingestion block 102, for example, during their execution. Instrumentation such as vulnerability detection can be provided by a vulnerability detection engine 104 for evaluating the applications during their execution. During runtime, the instrumented application gets inputs and creates outputs as part of its regular workflow. Each input that arrives at an instrumented input (source) point is checked by one or more vulnerability sensors, which examine the input for syntax that is characteristic of attack patterns, such as SQL injection, cross-site scripting (XSS), file path manipulation, and/or JavaScript Object Notation (JSON) injection. For example, Runtime Application Self-Protection (RASP) agents 112a and 112d can be provided in corresponding applications 110a and 110d for evaluating the execution of applications during runtime. As will be described below, such agents can also be utilized to provide vulnerability/security issues at call stack level for an application during runtime. For example, RASP agents 112a and/or 112b can examine call stacks that may be called during application runtime to determine whether such call stacks are authorized (allowed) to be called by the application or not.

RASP agents 112a, 112b, 112c, and 112d may conduct any type of security evaluation of applications as they execute. In some examples, as shown with reference to FIG. 1B, applications 130a and 130b can be stored on a code repository 120 or other memory storage, rather than being actively executed on a computing resource. Similar agents such as RASP agents can perform analysis (e.g., static analysis) of the applications. A code scanner agent 122, for example, can be used to analyze the code in applications 130a and 130b. RASP agents 112a, 112b, 112c, 112d, and/or code scanner agent 122 or other such embedded solutions can be used for analyzing the health and state of applications in various stages, such as during runtime or in a static condition in storage.

In some examples, sensors can be used to monitor and gather dynamic information related to applications executing on the various servers or virtual machines and report the information to the collectors for analysis. The information can be used for providing application security, such as to the RASP agents. The RASP techniques, for example, can be used to protect software applications against security vulnerabilities by adding protection features into the application. In typical RASP implementations, these protection features are instrumented into the application runtime environment, for example by making appropriate changes and additions to the application code and/or operating platform. The instrumentation is designed to detect suspicious behavior during execution of the application and to initiate protective action when such behavior is detected.

During runtime of applications on virtual machines or servers in network environment 100, for example, the sensors provided for monitoring the instrumented applications can receive inputs and creates outputs as part of the regular workflow of the applications. In some examples, inputs that arrives at an instrumented input (source) point of a sensor can be checked for one or more vulnerabilities. For example, the sensors may gather information pertaining to applications to be provided to one or more collectors, where an analytics engine can be used to analyze whether vulnerabilities may exist in the applications.

The vulnerabilities can include weaknesses, feature bugs, errors, loopholes, etc., in a software application that can be exploited by malicious actors to gain access to, corrupt, cause disruptions, conduct unauthorized transactions, or cause other harmful behavior to any portion or the entirety of network environment 100. For example, cyber-attacks on computer systems of various businesses and organizations can be launched by breaching security systems (e.g., using computer viruses, worms, Trojan horses, ransomware, spyware, adware, scareware, and other malicious programs) due to vulnerabilities in the software or applications executing on network environment 100. Most businesses or organizations recognize a need for continually monitoring of their computer systems to identify software at risk not only from known software vulnerabilities but also from newly reported vulnerabilities (e.g., due to new computer viruses or malicious programs). Identification of vulnerable software allows protective measures such as deploying specific anti-virus software, restricting operation of the vulnerable software to limit damage, preventing access to suspicious/unauthorized call stacks, etc.

Figure 1B:
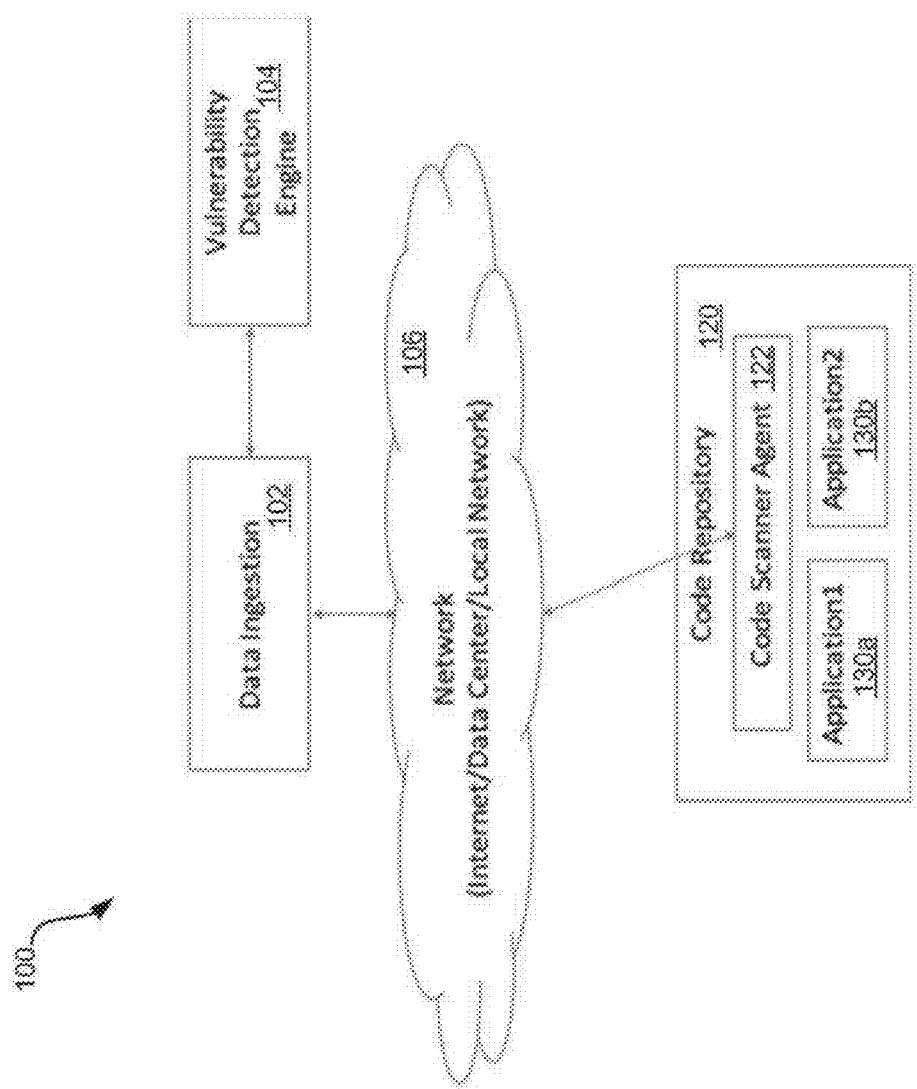
Figure 2:
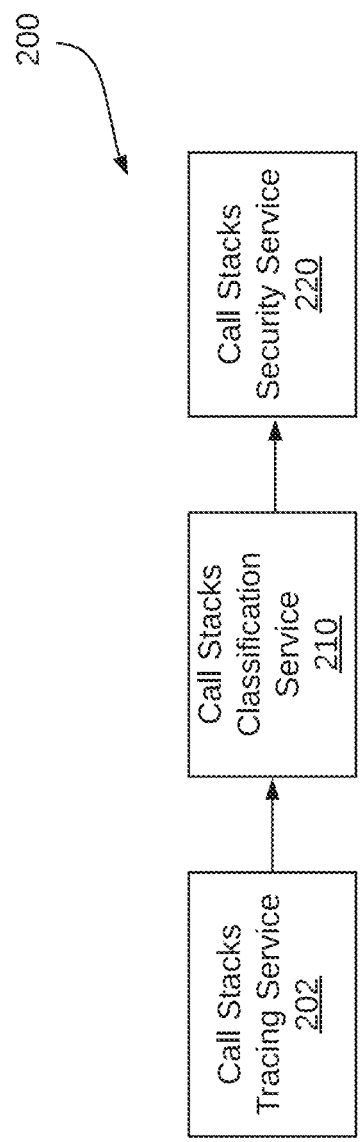
FIG. 2 illustrates an example of a software call stacks security system, according to one aspect of the present disclosure.

FIG. 2 illustrates an example of a software call stacks security system, according to one aspect of the present disclosure. Software call stacks security system 200 can include a call stacks tracing service 202, a call stacks classification service 210, and a call stacks security service 220. The call stacks security system 200 illustrates various functional blocks whose functionality will be explained below, while keeping in mind that these functional blocks may be implemented by a suitable combination of computational devices, network systems, and storage mechanisms such as those provided in the network environment 100. For example, functionalities of call stacks tracing service 202 can be implemented by RASP agents 112a, 112b, 112c, 112d and/or code scanner agent 122 described above with reference to FIGS. 1A and 1B. Furthermore, functionalities of call stacks classification service 210 and call stacks security service 220 can be implemented by vulnerability detection engine 104. In another example, all functionalities of call stacks tracing service 202, call stacks classification service 210 and call stacks security service 220 can be implemented vulnerability detection engine 104.

Call stacks tracing service 202 can be used to perform call stack tracing and enumerating of an application or a number of applications. For example, the different stages include integration testing, pre-production stage, and production stages in the past. In one example, call stacks tracing service 202 can generate lists of the runtime call stacks periodically, such as every millisecond, every second, every minute, every hour, etc. Each list of the runtime call stacks includes all runtime call stacks of the application at a certain point in time. The runtime call stacks include all possible call stacks that are accessed by the application (or can be accessed by the application) and occupy memory capacity at the time of the generation of a list. Based on the lists of runtime call stacks in a first set of execution environments, such as a testing environment, call stacks tracing service 202 can generate a tracing list of all software call stacks encountered.

In another example, call stacks tracing service 202 can trace runtime software call stacks encountered in a second set of execution environments that may introduce potential security threats into the application. For example, such second set of execution environments of the application can include an environment in which a penetration test is performed on the application. These software call stacks can also be stored in the tracing list. However, as these software call stacks might be associated with a potential security threat to the application, they can be stored as a separate authorized/insecure list (blacklist) other than the list of runtime call stacks in the first set of execution environments.

In yet another example, such tracing list can include a combination of all periodic lists of runtime call stacks along with an execution order in which the software call stacks were executed. Such execution order can be stored for both runtime call stacks in the first and second sets of execution environments. Examples of such execution order will be described in more detail with reference to FIGS. 5A, 5B, and 5C.

Call stacks tracing service 202 can transmit/provide such a tracing list to call stacks classification service 210 for further processing. Using the tracing list created by call stacks tracing service 202, the call stacks classification service 210 can determine a whitelist and a blacklist, as will be described below.

The whitelist can include a subset or all of the software call stacks included in the tracing list. In some examples, call stacks classification service 210 can generate the whitelist based on manual feedback. During any execution environment, call stacks may be manually identified (e.g., by a network operator) as secure/authorized call stacks. A list of authorized call stacks may be created. Such a list may include call stacks for a number of applications and may not necessarily be limited to one application. In another example, such a list may include multiple entries that associate each call stack with one or more applications and indicates whether, for each application, a given call stack is authorized or not. Call stacks classification service 110 can use such a list to generate the whitelist from the tracing list received for a given application. In one example, such list of manually created authorized call stacks may be periodically updated (e.g., once an hour, once a day, once a week, once a month, etc.)

A blacklist can include a subset or all of the software call stacks encountered within the second set of execution environments (e.g., a testing environment) of the application in the tracing list and/or unauthorized call stacks identified during previous runtimes of the application. In some examples, call stacks classification service 210 can generate the blacklist based on manual feedback and in a similar manner as the manual process for creating the whitelist described above.

The whitelist and the blacklist also include the execution order of each software call stack, as described above with regard to call stacks tracing service 202. Each execution order of each specific software call stacks can be marked as either authorized or unauthorized, and stored with the corresponding software call stack in either the whitelist or the blacklist.

Software call stacks may be determined as secure for inclusion in the whitelist or insecure for inclusion in the blacklist based on various criteria. For example, some call stacks may be considered insecure in a specific setting or a condition in which an application is deployed/executed while the same call stacks may be considered secure in other settings in which an application is deployed. For example, type of connectivity can be a setting/condition that impacts whether a given call stack is whitelisted or not. In one case, an application A may have a corresponding call stack X that will be called when the application A is deployed. If a terminal is using a public Wi-Fi connection to access application A, the call stack X may be considered insecure/unauthorized for application A while if the terminal is using a secure private network connection for accessing application A, then call stack X is deemed authorized/secure. Accordingly, the manually created link may also include an entry indicating a setting (or a condition) in which a call stack is to be whitelisted. Another example of a setting or a condition is a version of an application. For example, call stack X may be authorized for a first version of application A but not for a second version of application A. Call stacks classification service 210 can update the whitelist and the blacklist periodically even after the application is in production stage and/or after deployment.

Those skilled in the art will understand that call stacks tracing service 202 can trace and enumerate software call stacks using techniques that are specific to the type of the program code of the application or applications. In an example of a JAVA-based application, a thread of execution "public static Map<thread,StackTraceElement[ ]>getAllStackTraces( )" can be used to return a map of stack traces for all live threads, which includes all runtime stacks corresponding to that thread of the JAVA-based application. In an example of a PYTHON-based application, the module "traceback" and its related functions can be used to extract, format, and print all stack traces of the PYTHON-based application.

Call stacks classification service 210 can use a classifier trained using a machine learning model to classify software call stacks as either authorized or unauthorized. The machine learning model can be trained using positive and negative example call stacks (authorized and unauthorized example call stacks) as well as manual feedback to provide a system that automatically scores any detected call stack and uses the score and a corresponding threshold for determining whether a detected call stack is to be whitelisted or blacklisted. This process will be further described below with regard to FIG. 4.

Execution orders of software call stacks can also be used as additional training data to train the machine learning model. This will be further described below.

Call stacks classification service 210 can transmit/provide the software call stack classification results and the resulting scores to call stacks security service 220 for further processing and implementation of appropriate security policies, as will be described below.

Call stacks security service 220 can control the execution of each software call stack during deployment of the application. In one example, call stacks security service 220 can apply security policies on each software call stack based on the classification result from call stacks classification service 110. One example security policy can include allowing execution of a software call stack that is classified as authorized by call stacks classification service 210. Another example security policy can include blocking execution of a software call stack that is classified as unauthorized by call stacks classification service 210. Another example security policy can include flagging or warning about an encountered software call stack that is classified as unauthorized by call stacks classification service 210.

In some examples, call stacks security service 220 can apply security policies on each software call stack based on the scoring result from the call stacks classification service 210, when call stacks classification service 210 is a machine learning trained classifier. Such classifier can assign a score on any encountered call stack during application runtime. One example security policy can include allowing execution of a software call stack with a score above a predetermined threshold, while blocking or flagging a software call stack with a score below the predetermined threshold. Another example security policy can include setting an authorized score range, an unauthorized score range, and an undetermined score range. This security policy includes allowing execution of a software call stack with a score within the authorized score range, blocking or flagging a software call stack with a score within the unauthorized score range, and submitting a software call stack with a score within an undetermined score range for manual review (e.g., within a range of a threshold score as described above).

Although FIG. 2 illustrates an example configuration of the various components of a software call stacks security system applied within example system 100 of FIGS. 1A and 1B, those skilled in the art will understand that the components of software call stacks security system 200 or any system described herein can be configured in a number of different ways and can include any other type and number of components. For example, functionalities of call stacks tracing service 202, call stacks classification service 210, and/or call stacks security service 220 can be implemented using a single component or set of instructions executed by a processor. In another example, part or all of the machine learning model and its associated scoring system in call stacks classification service 210 can be included in either call stacks tracing service 202 or call stacks security service 220. Services can also be combined into fewer components and/or further divided into more components.

With examples of a software call stacks security system described above with reference to FIG. 2, the disclosure now turns to example methods for applying zero-trust security policies at the software call stack level. A security system, such as call stacks security system 200, can apply zero-trust security policies utilizing the classification and score result of each software call stacks, such as the classification and scoring result from the call stacks classification service 210. As noted above, functionalities of call stacks security system 200 can be implemented by vulnerability engine 104 or other components of system 100.

Figure 3:
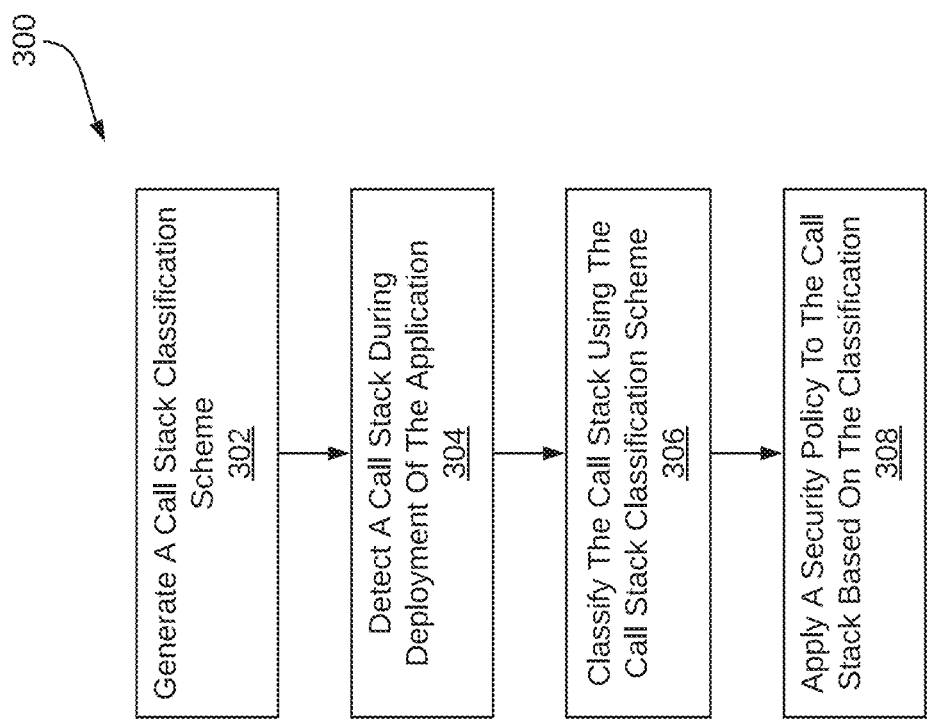
FIG. 3 illustrates an example method for applying zero-trust security policies at the software call stack level, according to one aspect of the present disclosure.

FIG. 3 illustrates an example method for applying zero-trust security policies at the software call stack level, according to one aspect of the present disclosure. Process of FIG. 3 will be described from the perspective of any suitable combination of components of system 100 of FIG. 1, the call stacks tracing service 202, the call stacks classification service 210, and the call stacks security service 220 of FIG. 2. However, it should be understood that each of the call stacks tracing service 202, the call stacks classification service 210, and the call stacks security service 220 may have one or more processors executing computer-readable instructions stored on an associated memory to implement the process 300 of FIG. 3.

At S302, vulnerability engine 104 (by implementing functionalities of call stacks classification service 210) may generate a call stack classification scheme. In one example, generating such call stack classification scheme may include determining a whitelist and/or a black list of software call stacks for an application. In one example, such whitelist and/or blacklist can be determined using a manual process as described above with reference to FIG. 2. S302 may be determined in advance of an application runtime or deployment of an application or alternatively can be determined upon detection of an application being deployed. If determined in advance, S302 may be a separate process by itself and not necessarily be part of the overall steps and functionalities of FIG. 3.

In another example, generating such call stack classification scheme may include training a classifier using machine learning techniques as will be described below with reference to FIG. 4. Such classifier may be trained to either provide a score for any given/encounter call stack during application runtime (which can then be compared to a threshold for determining whether the call stack is authorized or not) or alternatively may be trained to classify an encountered call stack as authorized or not.

At S304, during deployment of the application, vulnerability engine 104 (by implementing functionalities of call stacks classification service 210) may detect a call stack during deployment of the application. In one example, vulnerability engine 104 can record information regarding the runtime call stack as descried with regard to FIG. 2, such information can include the execution order of the runtime call stack.

At S306, vulnerability engine 104 (by implementing functionalities of call stacks classification service 210) may classify the call stack detected at S304 using the call stack classification scheme determined at S302. In one example, a neural network (a classifier) can be used to classify the call stacks as noted above, the generation of which will be described in detail with respect to FIG. 4 below. Such classifier can be trained to either provide a score for any given/encounter call stack during application runtime (which can then be compared to a threshold for determining whether the call stack is authorized or not) or alternatively may be trained to classify an encountered call stack as authorized or not.

In one example, when utilizing a trained classifier, vulnerability engine 104 may receive, as input, an encountered call stack (and/or associated execution order) and provide, as output, a score for the encountered call stack. Then, vulnerability engine 104 may compare the score to a threshold or a range threshold, as described above, to determine whether the encountered call stack is an authorized call stack or not. In another example, the trained classifier can be used to receive as input the encountered call stack and provide as output a classification of the encountered call stack as an authorized call stack or an unauthorized call stack.

In another example, the call stack classification scheme can be a manually created one (a whitelist and/or a blacklist as described above). In the case of a manually created whitelist, vulnerability engine 104 may receive, as input, an encountered call stack (and/or associated execution order) and compare the encountered call stack against the whitelist. If the whitelist indicates that the encountered whitelist is an authorized call stack, vulnerability engine 104 classifies the encountered call stack as an authorized call stack. Otherwise, vulnerability engine 104 classifies the encountered call stack as an unauthorized call stack. Accordingly, at S306, vulnerability engine 104 provides a classification result for each encountered call stack.

At S308, vulnerability engine 104 (by implementing functionalities of call stacks security service 220) may apply a security policy on each of the software call stack based on the classification result. In one example, a security policy can indicate only allowing access to the application by authorized software call stacks included in the whitelist, and denying access to the application by call stacks classified as unauthorized call stacks.

Figure 4:
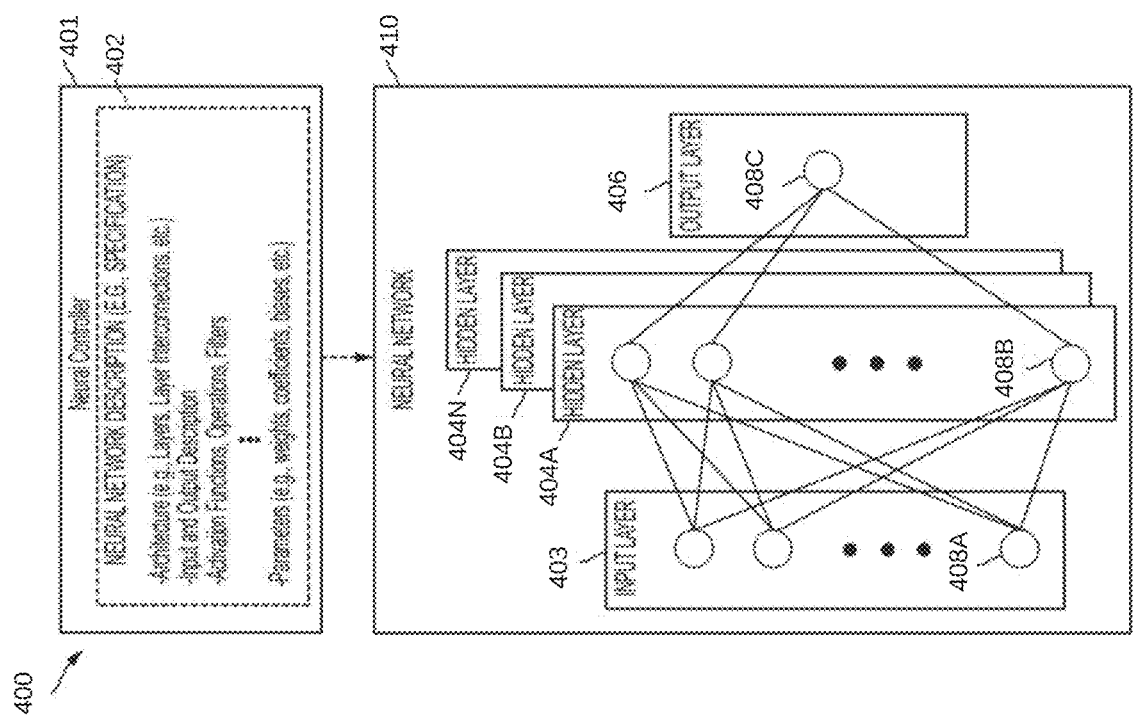
FIG. 4 illustrates an example neural architecture, according to one aspect of the present disclosure.

Example process of FIG. 4 enables for applying zero-trust security policies at the software call stack level for any application executed at endpoints of an enterprise network in order to improve over application and network security within such enterprise networks.

As described above with reference to FIG. 3, vulnerability engine 104 may utilize a trained classifier for classifying encountered call stacks as either authorized or unauthorized. The disclosure now turns to example methods for training a classifier (a neural network) to classify the software call stacks.

FIG. 4 illustrates an example neural architecture, according to one aspect of the present disclosure.

FIG. 4 illustrates an example neural architecture 400 of a neural network 410 (which can be referred to as classifier 410) defined by an example neural network description 402 in neural controller 401. Neural network description 402 can include a full specification of neural network 410, including neural architecture 400. For example, neural network description 402 can include a description or specification of architecture of neural network 410 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

Neural network 410 can reflect the neural architecture 400 defined in neural network description 402. In this non-limiting example, neural network 410 includes an input layer 403, which includes input data, which can be any type of data such as media content (images, videos, etc.), numbers, text, etc. In one illustrative example, input layer 403 can include data representing a software call stack. In an example context related to call stacks security system 200, the data representing a software call stack can include the tracing list generated by the call stacks tracing service 202 as described with regard to FIG. 2. In another example, the data representing a software call stack can include the information of the software call stacks detected during the application deployment by the call stacks tracing service 202.

Neural network 410 can include hidden layers 404A through 404N (collectively "404" hereinafter). Hidden layers 404 can include n number of hidden layers, where n is an integer greater than or equal to one. The number of hidden layers can include as many layers as needed for a desired processing outcome and/or rendering intent. In one illustrative example, any one of the hidden layer 404 can include data representing one software call stack that has already been classified in either the whitelist or the blacklist. Such data can include the data of each software call stack included in either the whitelist or the blacklist as described with regard to FIG. 2. Such data can also include which one of the whitelist or the blacklist that each software call stack is included in.

Neural network 410 further includes an output layer 406 that provides an output resulting from the processing performed by hidden layers 404. In one illustrative example, output layer 406 can provide an output data based on the input data. In one example context related to call stacks security system 200, the output data can include a classification of the input software call stack as either authorized or unauthorized. In another example, the output data can include a score for the input software call stack, which can then be compared to an example threshold or an example range of thresholds to classify the corresponding software call stack as authorized or unauthorized.

Neural network 410, in this example, is a multi-layer neural network of interconnected nodes. Each node can represent a piece of information. Information associated with the nodes is shared among the different layers and each layer retains information as information is processed. In some cases, neural network 410 can include a feed-forward neural network, in which case there are no feedback connections where outputs of the neural network are fed back into itself. In other cases, neural network 410 can include a recurrent neural network, which can have loops that allow information to be carried across nodes while reading in input.

Information can be exchanged between nodes through node-to-node interconnections between the various layers. Nodes of input layer 403 can activate a set of nodes in the first hidden layer 404A. For example, as shown, each input node of input layer 403 is connected to each node of first hidden layer 404A. Nodes of hidden layer 404A can transform the information of each input node by applying activation functions to the information. The information derived from the transformation can then be passed to and can activate the nodes of the next hidden layer (e.g., 404B), which can perform their own designated functions. Example functions include convolutional, up-sampling, data transformation, pooling, and/or any other suitable functions. The output of hidden layer (e.g., 404B) can then activate nodes of the next hidden layer (e.g., 404N), and so on. The output of last hidden layer can activate one or more nodes of output layer 406, at which point an output is provided. In some cases, while nodes (e.g., nodes 408A, 408B, 408C) in neural network 410 are shown as having multiple output lines, a node has a single output and all lines shown as being output from a node represent the same output value.

In some cases, each node or interconnection between nodes can have a weight that is a set of parameters derived from training neural network 410. For example, an interconnection between nodes can represent a piece of information learned about the interconnected nodes. The interconnection can have a numeric weight that can be tuned (e.g., based on a training dataset), allowing neural network 410 to be adaptive to inputs and able to learn as more data is processed.

Neural network 410 can be pre-trained to process the features from the data in input layer 403 using different hidden layers 404 in order to provide the output through the output layer 406. In an example in which neural network 410 is used to classify software call stacks, neural network 410 can be trained using training data that includes example classified software call stacks. For example, training software call stacks can be input into neural network 410, which can be processed by the neural network 410 to generate outputs which can be used to tune one or more aspects of the neural network 410, such as weights, biases, etc.

In some cases, neural network 410 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training media data until the weights of the layers are accurately tuned.

In the example of classifying or scoring a software call stack, a classifier based on the trained neural network 410 can be included in the call stacks classification service 210.

For the example of classifying a software call stack, the forward pass can include passing data of a software call stack through neural network 410. The weights can be initially randomized before neural network 410 is trained. The data of a software call stack can include, for example, an array of numbers and/or letters representing the function of such software call stack, the code of such software call stack in the past, the values of the stack frame and the frame pointer related to such software call stack, etc.

Neural network 410 can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 410 can represent any other neural or deep learning network, such as an autoencoder, a deep belief nets (DBNs), a recurrent neural networks (RNNs), etc.

NAS involves a process in which neural controller 401 searches through various types of neural networks such as CNNs, DBNs, RNNs, etc., to determine which type of neural network, given the input/output description of neural network description 402, can perform closes to the desired output once trained. This search process is currently cumbersome and resource intensive, because every type of available neural network is treated as a "blackbox." In other words, a neural controller such as neural controller 401 selects an available neural network (a blackbox), trains it, validates it and either selects it or not depending on the validation result. However, each available example or type of neural network is a collection of nodes. As will be described below, the present disclosure enables gaining insight into performance of each individual node to assess its performance, which then allows the system to select of a hybrid structure of nodes that may or may not be the same as a given particular structure of a neural network currently available. In other words, the present disclosure enables an AutoML system to pick and choose nodes from different available neural networks and create a new structure that performs best for a given application.

The classifier based on the neural network 410 can also be trained to score a software call stack encountered during production stage of deploying the application. To train the neural network 410 to score a software call stack, a training score for each of the software call stack included in the hidden layer 404 can be assigned before training. Each node of the output layer 406 can represent each of a finite number of scores, and the output layer 406 can output a score for the software call stack.

In one example, the score of each software call stack represents the likelihood of a software call stack being secure and authorized. For example, the score of each software call stack can be a number (e.g., within a range of 0-10, 0-20, 0-100, etc.), a percentage and/or any other type of indicator on a scale. There may be a threshold score against which a score can be compared to determine whether a software call stack is authorized or unauthorized. For example, a score above a threshold score may be indicative of an authorized call stack while a score below the threshold score may be indicate of an unauthorized call stack. In another example, a score within a given range of the threshold score (e.g., within 1 point or 1% of the threshold score) may be included in a greylist. In one example, call stacks in a greylist may be presented for manual analysis/inspection in order to determine whether they should be included in a whitelist or a blacklist. Such threshold score may be determined according to any known or to be developed method and/or empirical studies. For example, the score of each software call stack can be a percentage. Referring back to FIG. 2, the call stacks classification service 210 can classify a software call stack based on the threshold score and the score of such software call stack generated by the classifier.

The scores are determined based on different factors. When determining the final score, the same or different weights can be assigned to individual scores based on different factors.

In one example, a score can be determined based on how often a software call stack has been encountered during different stages of the execution of the application. The whitelist can include a software call stack along with a corresponding number of times this specific software call stack has been encountered. Thus, a trained classifier can assign a higher score to a software call stack due to the higher number of encounters during different stages of the execution of the application.

In another example, the scores are determined based on a factor of whether the encountered execution order of software call stacks have been marked as authorized in the whitelist or unauthorized in the blacklist. For example, the whitelist includes all executed orders of software call stacks that includes a specific software call stack in a secure execution environment. If a new order of execution involving a software call stack is encountered, and the new order is not included in the whitelist, the machine learning model can assign a lower score for this software call stack indicating a lower likelihood that the software call stack should be authorized. For another example, the blacklist includes all executed orders of software call stacks that includes a specific software call stack and are deemed to be insecure and unauthorized. If a new order of execution involving a software call stack is encountered, and the new order is included in the blacklist, the machine learning model can assign a lower score for this software call stack indicating a lower likelihood that the software call stack should be authorized.

After generating the score for the software call stacks, the classifier can transmit the score to call stacks classification service 210. The call stacks classification service 210 can classify such software call stack based on the score as described in S306 of FIG. 3.

Although FIG. 4 is illustrated from the perspective of various components within the example systems of FIGS. 1 and 2, those skilled in the art will understand that the components of the neural architecture 400 or the neural network 410 or any system described herein can be configured in a number of different ways and can include any other type and number of components.

With examples of a software call stacks security system, a method for applying zero-trust security policies at the software call stack level, and an example neural architecture for classifying and scoring a software call stack described with reference to FIGS. 1-4, the disclosure now turns to FIGS. 5A, 5B, and 5C for description of example graph of software call stacks to further illustrate the operation of the software call stacks security system 200 and/or other components of systems described above.

Figure 5A:
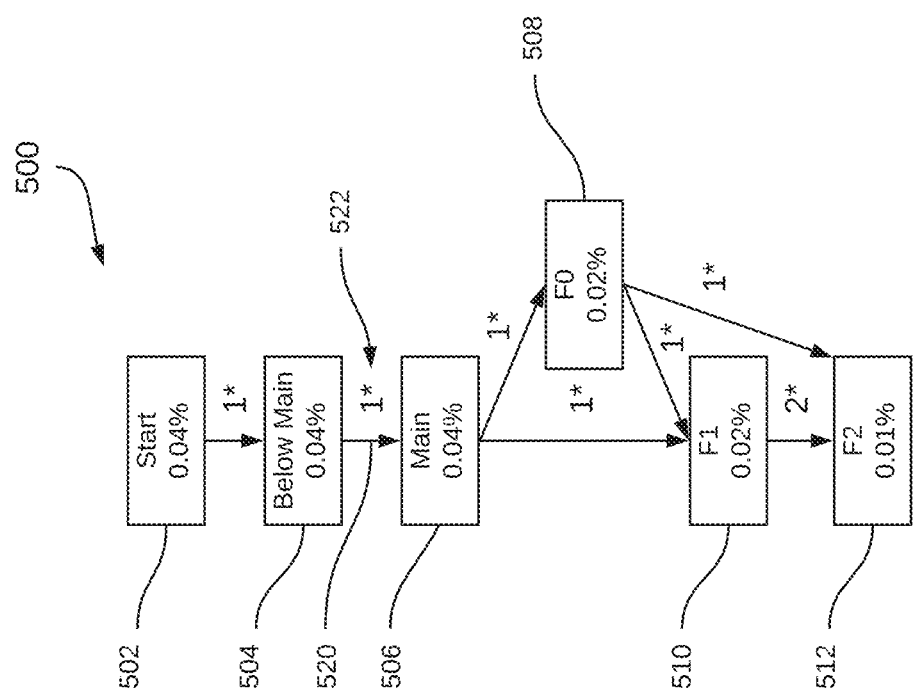
FIGS. 5A-C illustrate example graphs of software call stacks, according to one aspect of the present disclosure.
Figure 5B:
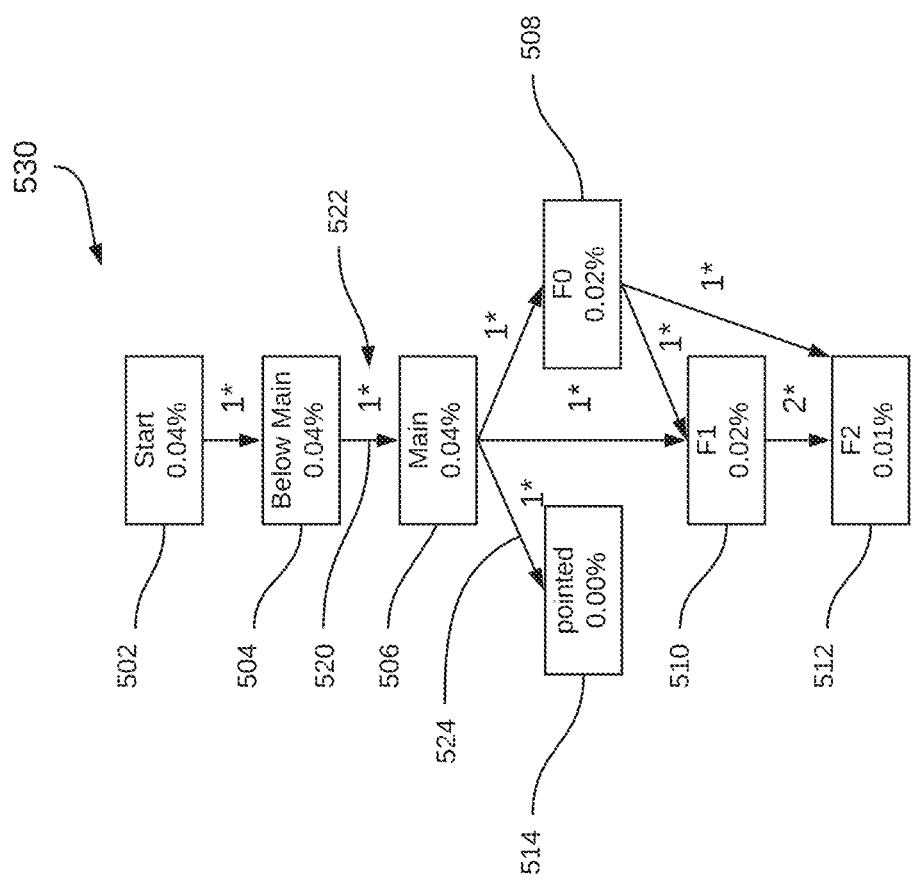
Figure 5C:
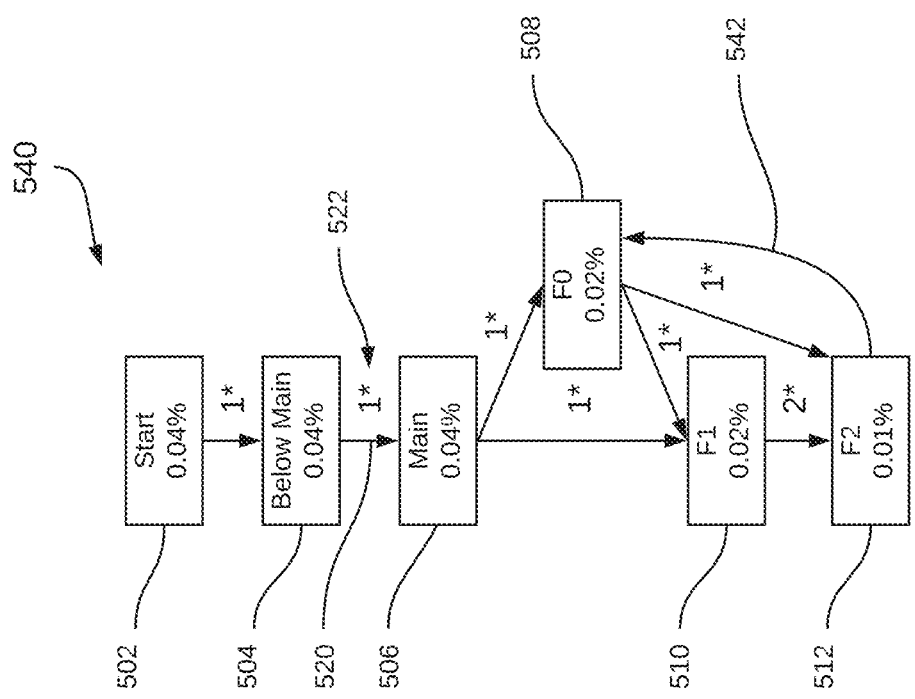

FIGS. 5A-C illustrate example graphs of software call stacks, according to one aspect of the present disclosure. Example graphs of FIG. 5A, FIG. 5B, and FIG. 5C will be described from the perspective of vulnerability engine 104 implementing functionalities of call stacks tracing service 202, call stacks classification service 210, and call stacks security service 220 of FIG. 2, as described above. However, those skilled in the art can readily appreciate that other system configurations and components capable of carrying the functionalities for implementing zero-trust security at software call stack level are also within the scope of the present disclosure.

FIG. 5A illustrate example graph 500 of software call stacks encountered during past stages of execution of an application. Each of boxes 502, 504, 506, 508, 510, and 512 represents a software call stack encountered during past stages of execution of an application and form an example whitelist. For example, box 502 represents software call stack titled as main. The percentages in the boxes represent the enumeration based on tracing the software call stacks during the past stages. For example, the 0.04% in software call stack 506 represents the number of times software call stack main has been called as a percentage (e.g., 0.04% of all the calls in the corresponding application). Each arrow connecting the boxes, such as arrow 520, represents the execution order of the software call stacks. For example, arrow 520 indicates that software call stack 504 was called before software call stack 506. The number, such as number 522, on the right of each arrow represents the number of times a particular call order was taken. For example, the call order from software call stack 504 to software call stack 506 has happened once in the past stages. In some examples, the call stacks classification service 210 can include the above information, such as the number of times software call stack main has been called as a percentage, the execution order, the number of times a particular call order was taken in the whitelist as conditions for classifying any call stack detected in the future as an authorized call stack.

FIG. 5B illustrate example graph 530 of software call stacks encountered during deployment of an application. The software call stack 514 titled as pointed and the execution order 524 are not included in the example whitelist of FIG. 5A. Thus, the call stacks classification service 210 can classify software call stack 514 as unauthorized and the call stacks security service 220 can block software call stack 514 from accessing the corresponding application during runtime. In one example of using a classifier, call stacks classification service 210, upon encountering software call stack 514 can determine a score for the software call stack 514, which can be compared to a threshold in order to identify software call stack 514 as unauthorized. Alternatively, the classifier can provide as output a classification of software call stack 514 as unauthorized. In another example, such trained classifier can determine a score for the software stack 514 within an undetermined range as described in detail with regard to FIGS. 2 and 4. In this instance, call stacks classification service 210 can submit software call stack 514 and the execution order 524 for a manual review before classifying software call stack 514 as unauthorized.

FIG. 5C illustrate example graph 540 of software call stacks encountered during deployment of an application. Execution order 542 is not included in the example whitelist of FIG. 5A. Thus, even though software call stacks 508 and 512 are included in the whitelist, call stacks classification service 210 can classify software call stack 512 as unauthorized because of execution order 542. As noted above, such classification can be based on a manually created whitelist or alternatively using a trained classifier described above. In one example of using a classifier, call stacks classification service 210, upon encountering software call stack 508 in this execution order, can determine a score for the software call stack 508, which can be compared to a threshold in order to identify software call stack 508 as unauthorized. Alternatively, the classifier can provide as output a classification of software call stack 508 as unauthorized because of execution order 542 not included in the example whitelist. Therefore, call stacks security service 220 can block access to runtime application by call stack 508.

Figure 6A:
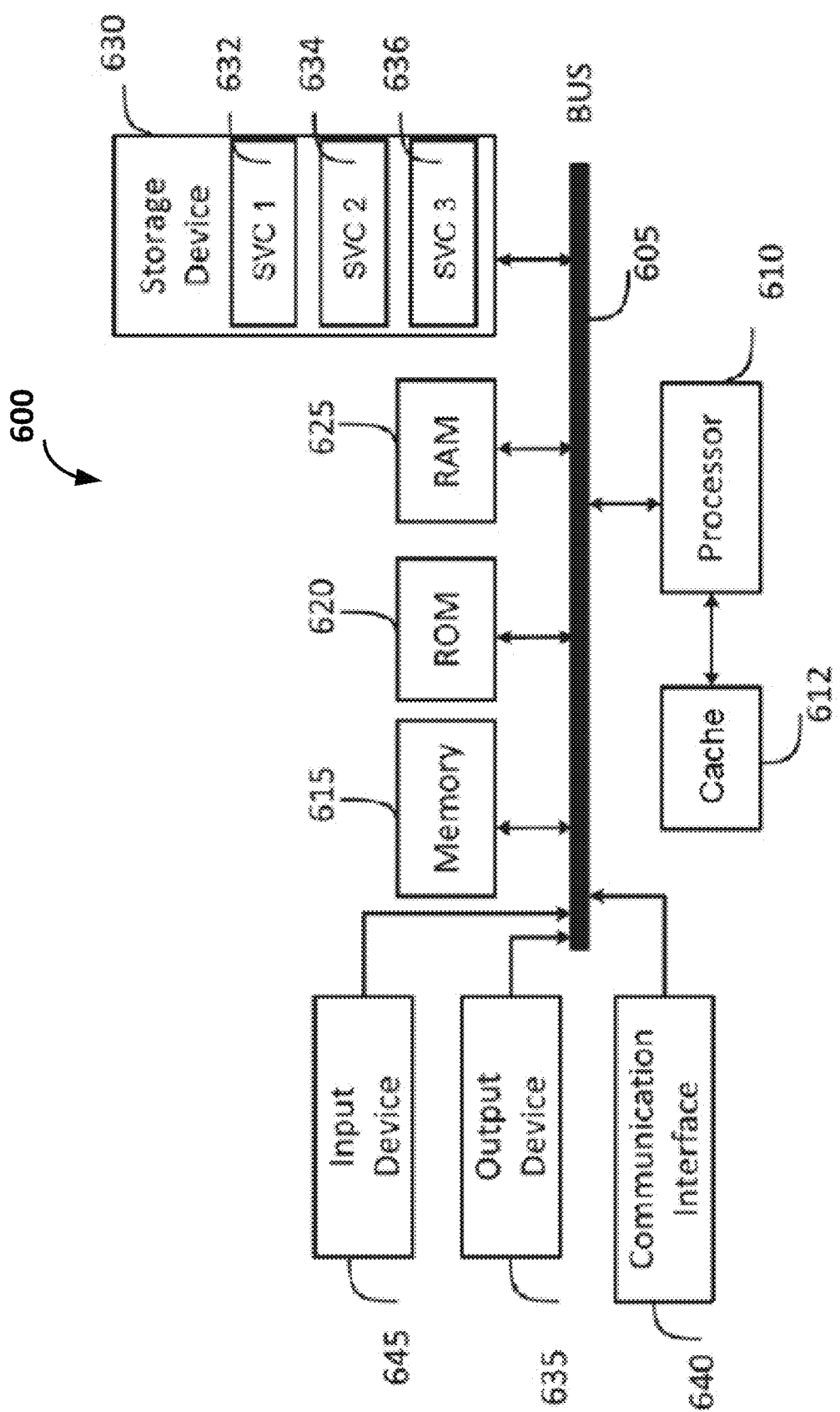
FIGS. 6A-B illustrate examples of systems, according to one aspect of the present disclosure.
Figure 6B:
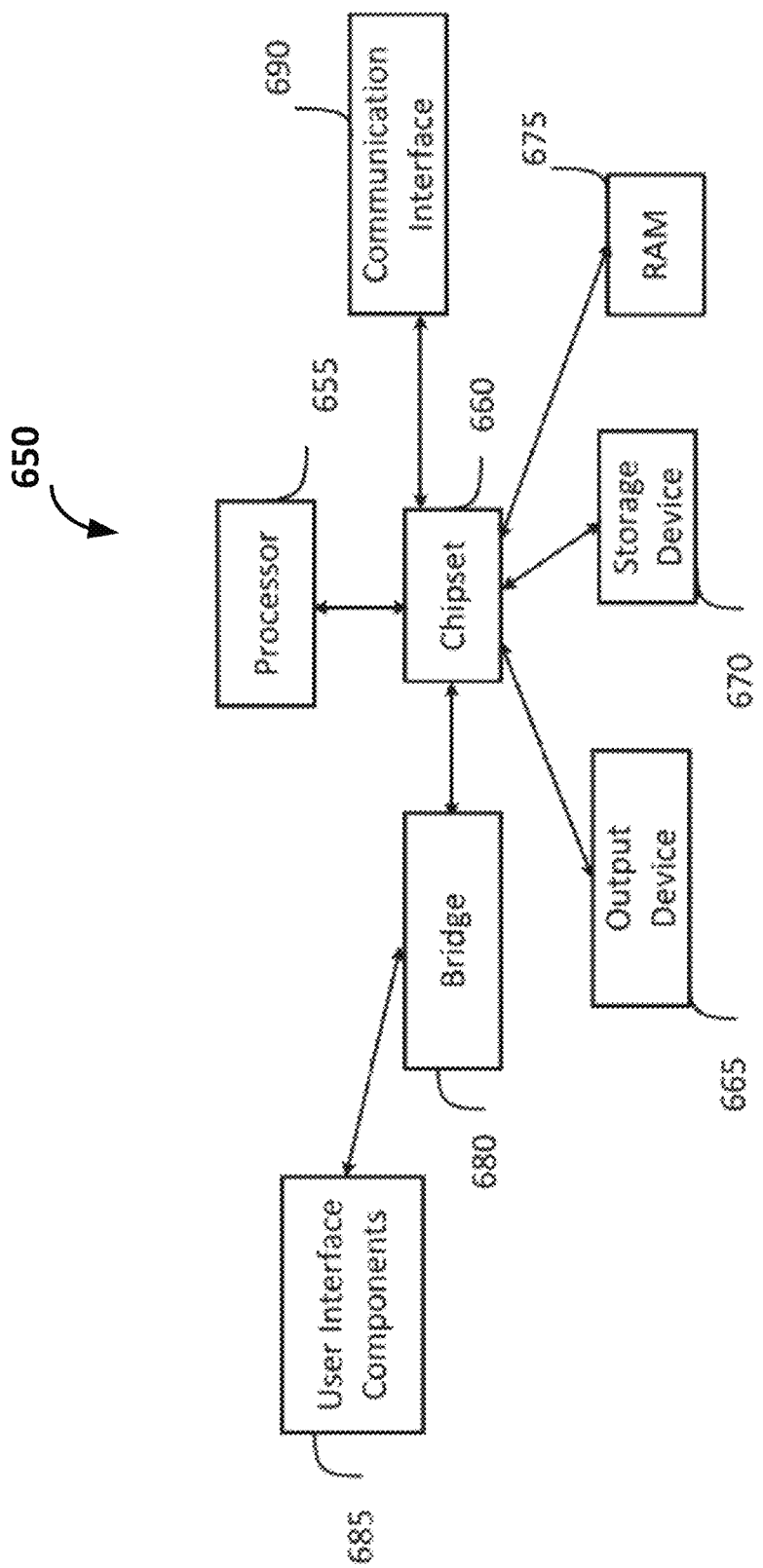

With examples of zero-trust security scheme at software call stacks level described above with reference to FIGS. 1-5, the disclosure now turns to FIGS. 6A and 6B for description of example system architectures for implementing the software call stacks security system 200 and/or other components of systems described above.

FIGS. 6A-B illustrate examples of systems, according to one aspect of the present disclosure. The more appropriate system will be apparent to those of ordinary skill in the art when practicing the various embodiments. Persons of ordinary skill in the art will also readily appreciate that other systems are possible.

FIG. 6A illustrates an example architecture for a bus computing system 600 wherein the components of the system are in electrical communication with each other using a bus 605. The computing system 600 can include a processing unit (CPU or processor) 610 and a system bus 605 that may couple various system components including the system memory 615, such as read-only memory (ROM) in a storage device 670 and random access memory (RAM) 675, to the processor 610. The computing system 600 can include a cache 612 of high-speed memory connected directly with, in close proximity to, or integrated as part of the processor 610. The computing system 600 can copy data from the memory 615 and/or the storage device 630 to the cache 612 for quick access by the processor 610. In this way, the cache 612 can provide a performance boost that avoids processor delays while waiting for data. These and other services can control or be configured to control the processor 610 to perform various actions. Other system memory 615 may be available for use as well. The memory 615 can include multiple different types of memory with different performance characteristics. The processor 610 can include any general-purpose processor and a hardware module or software service, such as service1 632, service2 634, and service3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

Storage device 630 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software services 632, 634, 636 for controlling the processor 610. Other hardware modules or software services are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, and solid state media, for example. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 655 analyzing data stored in the storage device 670 or the RAM 675. Further, the computing system 600 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   detecting a call stack during a first deployment of an application in a first operating environment;
   classifying the detected call stack as an unauthorized call stack based on a first score of the call stack using a classification scheme, wherein the first score is assigned during runtime of the first deployment of the application based in part on a determination that the first operating environment is unsecure;
   detecting the call stack during a second deployment of the application in a second operating environment;
   classifying the detected call stack as an authorized call stack based on a second score of the call stack using the classification scheme being greater than a threshold, wherein the second score is assigned during runtime of the second deployment of the application based in part on a determination that the second operating environment is secure; and
   modifying a security policy based on the classification of the application as unauthorized during the first deployment of the application to authorized during the second deployment of the application, wherein access to the application is denied during the first deployment of the application but is granted during the second deployment of the application,
   wherein an execution order of the call stack detected during the first deployment and the second deployment of the application is a condition for the call stack classification scheme to authorize or unauthorize the application.

2. The method of claim 1, wherein the classification scheme including a classifier trained using at least one machine learning technique using a list of previously known authorized call stacks and/or a list of previously known unauthorized call stacks to train the classifier.

3. The method of claim 2, wherein the classifier trained using the at least one machine learning technique is configured to identify detected call stacks as one of authorized or unauthorized call stacks.

4. The method of claim 2, wherein the classifier is trained to output the classification of the call stack detected during the runtime as one of the authorized call stack or the unauthorized call stack.

5. The method of claim 1, wherein classifying the detected call stack further comprises:
   comparing the first score to the threshold; and
   classifying the call stack as the unauthorized call stack if the score is less than the threshold.

6. The method of claim 1, further comprising:
   tracing call stacks during execution of the application;
   determining an execution order of each call stack; and
   labelling the application as authorized within the call stack application scheme based on the execution order of each call stack.

7. The method of claim 1, further comprising:
   tracing call stacks during execution of the application;
   based on the tracing, generating a graph of a percentage of each call stack encountered during the execution of the application; and
   labelling the application as unauthorized or authorized within the call stack application scheme based on the percentage of each call stack encountered during the execution of the application.

8. The method of claim 1, further comprising:
   determining a score for the call stack based on execution order;
   comparing the score to a threshold score to classify the call stack as authorized or unauthorized; and
   based on the call stack being classified as unauthorized, labelling the call stack and the execution order as blacklisted in the call stack classification scheme.

9. The method of claim 1, wherein the call stack is detected during runtime of the application by Runtime Application Self-Protection (RASP) agents that trace call stack functionality.

10. A system comprising:
    one or more memories having computer-readable instructions stored therein; and
    one or more processors configured to execute the computer-readable instructions to:
       detect a call stack during a first deployment of an application in a first operating environment;
       classify the detected call stack as an unauthorized call stack based on a first score of the call stack using a classification scheme, wherein the first score is assigned during runtime of the first deployment of the application based in part on a determination that the first operating environment is not secure;
       detect the call stack during a second deployment of the application in a second operating environment;
       classify the detected call stack as an authorized call stack based on a second score of the call stack using the classification scheme being greater than a threshold, wherein the second score is assigned during runtime of the second deployment of the application based in part on a determination that the second operating environment is secure; and
       modifying a security policy based on the classification of the application as unauthorized during the first deployment of the application to authorized during the second deployment of the application, wherein access to the application is denied during the first deployment of the application but is granted during the second deployment of the application,
       wherein an execution order of the call stack detected during the first deployment and the second deployment of the application is a condition for the call stack classification scheme to authorize or unauthorize the application.

11. The system of claim 10, wherein the classification scheme including a classifier trained using at least one machine learning technique using a list of previously known authorized call stacks and/or a list of previously known unauthorized call stacks to train the classifier.

12. The system of claim 11, wherein the classifier trained using the at least one machine learning technique is configured to detected call stacks as one of authorized or unauthorized call stacks.

13. The system of claim 11, wherein the classifier is trained to output the classification of the call stack detected during the runtime as one of the authorized call stack or the unauthorized call stack.

14. The system of claim 10, wherein the one or more processors are configured to execute the computer-readable instructions to:
    compare the first score to the threshold; and
    classify the call stack as the unauthorized call stack if the score is less than the threshold.

15. The system of claim 10, wherein the one or more processors are configured to execute the computer-readable instructions to:
    trace call stacks during execution of the application;
    determine an execution order of each call stack; and
    label the application as authorized within the call stack application scheme based on the execution order of each call stack.

16. The system of claim 10, wherein the one or more processors are configured to execute the computer-readable instructions to:
    trace call stacks during execution of the application;
    based on the tracing, generate a graph of a percentage of each call stack encountered during the execution of the application; and
    label the application as unauthorized or authorized within the call stack application scheme based on the percentage of each call stack encountered during the execution of the application.

17. The system of claim 10, wherein the one or more processors are configured to execute the computer-readable instructions to:
    determining a score for the call stack based on execution order;
    comparing the score to a threshold score to classify the call stack as authorized or unauthorized; and based on the call stack being classified as unauthorized, labelling the call stack and the execution order as blacklisted in the call stack classification scheme.

18. The system of claim 10, wherein the call stack is detected during runtime of the application by Runtime Application Self-Protection (RASP) agents that trace call stack functionality.

* * * * *